(12) United States Patent
Fiene

(10) Patent No.: US 7,184,251 B2
(45) Date of Patent: Feb. 27, 2007

(54) POWER SUPPLY WITH INTERNALLY LIMITED OUTPUTS FOR USE IN LIGHTING SYSTEMS FOR DIRECT MOUNTING ONTO A JUNCTION BOX

(75) Inventor: Dale E. Fiene, Algonquin, IL (US)

(73) Assignee: Ole K. Nilssen, Bonita Springs, FL (US)

( * ) Notice: Subject to any disclaimer, the term of this patent is extended or adjusted under 35 U.S.C. 154(b) by 113 days.

(21) Appl. No.: 10/948,982

(22) Filed: Sep. 23, 2004

(65) Prior Publication Data
US 2006/0061296 A1 Mar. 23, 2006

(51) Int. Cl.
*H02H 3/00* (2006.01)

(52) U.S. Cl. .................... 361/42; 361/48; 361/38; 361/1

(58) Field of Classification Search ............. None
See application file for complete search history.

(56) References Cited

U.S. PATENT DOCUMENTS

| | | | |
|---|---|---|---|
| 4,626,747 A | 12/1986 | Nilssen | 315/209 R |
| 4,631,648 A | 12/1986 | Nilssen | 362/150 |
| 4,651,059 A | 3/1987 | Nilssen | 315/182 |
| 4,667,133 A | 5/1987 | Nilssen | 315/312 |
| 5,003,227 A | 3/1991 | Nilssen | 315/161 |
| 5,047,696 A | 9/1991 | Nilssen | 315/312 |
| 5,479,326 A | 12/1995 | Nilssen | 362/148 |
| 5,640,069 A | 6/1997 | Nilssen | 315/209 R |
| 5,691,603 A | 11/1997 | Nilssen | 315/209 R |
| 2004/0008460 A1* | 1/2004 | Engel | 361/42 |

* cited by examiner

*Primary Examiner*—Tuyet Thi Vo

(57) ABSTRACT

A power supply assembly for a lighting system is directly mountable onto a standard electrical junction box. The power supply circuit provides an electronically power limited output through multi-conductor power connectors. The power supply assembly is used as part of a lighting system. The power supply output is used to connect to luminaires using a multi-conductor cable having multi-conductor power connectors which mate with the multi-conductor power connectors on the power supply and luminaire. The luminaires use a circuit to interface between the power supply output and the lamp.

27 Claims, 2 Drawing Sheets

POWER SUPPLY WITH INTERNALLY LIMITED OUTPUTS FOR USE IN LIGHTING SYSTEMS FOR DIRECT MOUNTING ONTO A JUNCTION BOX

This invention relates generally to a power supply assembly for lighting systems and, more particularly, to a power supply assembly for ceiling lighting systems, using gas-discharge lamps, that reduces the installed cost and the time it takes to wire and mount the power supply assembly to the building's electrical system.

BACKGROUND OF THE INVENTION

The power supply for the ceiling lighting system shown in Nilssen's U.S. Pat. No. 5,640,069 requires a special junction box for the conduit to connect power to the power supply since the power supply itself is mounted within the junction box. This requires special barriers to maintain separation between the power provided by the utility company and the output of the power supply. Lighting system power supplies have also been provided as plug-in units that are suitable for plugging into a duplex type outlet. These are not suitable for higher power units of 100 Volt-Amperes or greater and will not meet the National Electrical Code if installed above a suspended ceiling. Nolan's U.S. Pat. No. 6,609,804 shows an AC/DC power converter, but does not address how the power converter is mounted to the source of power.

SUMMARY OF THE INVENTION

Among the many objectives of this invention is the provision of improved packaging of a power supply for lighting systems.

It is another objective of the present invention to provide a power supply for lighting systems having a low cost with simplified mounting.

Still another objective of the present invention is to provide a power supply for lighting systems having multiple independently switched outputs.

These and other objectives of the invention (which other objectives become clear by consideration of the specification, claims and drawings as a whole) are met by providing a power supply assembly for providing input power to a luminaire. The power supply incorporates an enclosure including a mounting plate for mounting to an electrical junction box, input leads for connection with a source of electrical power supplied by a utility company, a power supply circuit suitable for powering a ballasting circuit for a gas discharge lamp, and a multi-conductor power connector suitable for receiving and connecting with a mating multi-conductor power connector attached to a multi-conductor cable.

BRIEF DESCRIPTION OF THE DRAWINGS

These and other features, objects and advantages of the present invention will become apparent from the following description and drawings wherein like reference numerals represent like elements in several views and in which.

DESCRIPTION OF THE PREFERRED EMBODIMENTS

Figure 1:
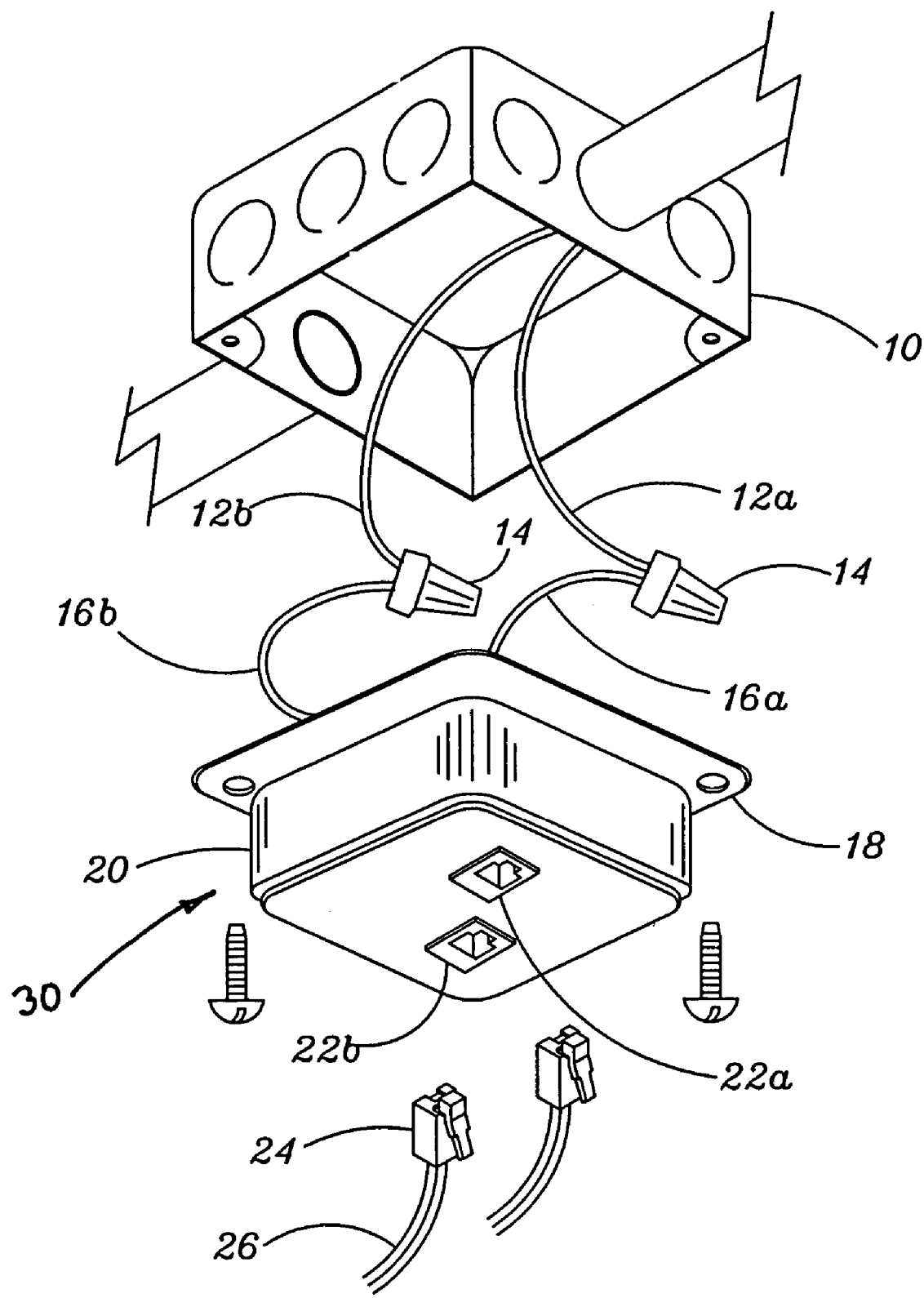
FIG. 1 depicts an exploded perspective view of how power supply assembly 30 is mounted to an electrical junction box 10.

The instant invention overcomes the problems of the prior art by providing a power supply for lighting systems that mounts directly onto a standard electrical junction box. This reduces the cost of the installed system by eliminating the need for a special junction box that needs to be much larger than the standard junction boxes that are commonly used. Alternately if a standard junction box is used it severely limits the power capacity of the power supply due to the severe limitations on it's physical size.

In a first embodiment (FIG. 1), a power supply assembly includes a power supply circuit for a lighting system. The power supply circuit is mounted in an enclosure that includes a mounting means that allows the power supply assembly to be mounted directly onto a standard electrical junction box. A pair of leads is provided to make electrical connection with the utility power source through a branch circuit of a building's electrical wiring. The enclosure includes a multi-conductor connector that accepts a mating multi-conductor connector provided on the end of a multi-conductor cable. The multi-conductor cable is typically then run to luminaires where it is used to provide power to ballasting circuits for gas-discharge lamps located within the luminaire. By using a power supply circuit that is electronically power limited, the National Electrical Code permits the use of cables connecting the power supply to the luminaire without the need to run the wiring in conduit or flexible armored tubing. The power supply assembly is mounted onto a standard junction box with substantially only the input power leads protruding into the junction box. The mounting plate provides a barrier between the branch circuit wiring and the power supply circuitry. The mounting means, such as the mounting plate in provided with holes as shown in the figure or more likely a slot and a keyhole to allow for faster installation. The components of the power supply circuit that dissipate the most heat, such as the power transistors, power diodes, transformers and inductors mounted onto or close to the inside of the outer walls of the enclosure if possible to minimize the temperature rise and thus thermal stress on all the components of the power supply circuitry. This will greatly increase the life of the components. For units that are unable to have their power dissipating components mounted directly to the enclosure, improvement in the reduction of component thermal stress can be achieved by adding thermally conductive potting compound to the unit, particularly in the area of the components with the greatest amount of dissipation to thermally couple the component to the enclosure. The available power that can be supplied from a unit roughly the size shown in FIG. 1 (4"×4") depends to a great extent on the efficiency of the power supply circuit topology chosen, but a unit that size should be able to handle up to approximately 200 watts.

For a second embodiment (FIG. 2), a power supply for higher power capability or less efficient topologies has at least one side that extends beyond the sidewalls of the electrical junction box to which it mounts. As the output capacity increases or less efficient topologies are used, physically larger components are required particularly for power inductors and transformers. There is often a restriction with respect to how far the front surface of the power supply assembly can extend from the wall or ceiling to which the junction box is attached, therefore the height of the enclosure of the power supply assembly is limited and the volume needs to be increased by increasing the length or width or both.

An additional feature depicted in this second embodiment is the capability to provide two separate outputs that can be switched on and off independently. This can be accomplished in several ways. The simplest, although likely not the most cost effective, way is to simply have two substantially separate power supply circuits built within the same enclosure. By applying line voltage between input power leads 16a and 16b, multi-conductor power connector 22a is energized by a first power supply circuit. By applying line voltage between input power leads 16a and 16c, multi-conductor power connector 22b is energized by a second power supply circuit. By applying line voltage simultaneously between input power leads 16a and 16b, and 16a and 16c, both multi-conductor power connector 22a and 22b are energized. Another variation on this embodiment is to use a multi-conductor power connector 22 with four terminals and use the outer pair for one output and the inner pair for a second circuit. The outer pair being energized when line voltage is applied between input power leads 16a and 16b, and the inner pair being energized when line voltage is applied between input power leads 16a and 16c.

A more cost effective alternative to using two separate power supply circuits for power supplies that have a high-frequency AC voltage output is to use a single DC power supply to provide filtered DC voltage to two separate high-frequency inverters. The power to the DC supply is brought in through two separate rectifier circuits by the three input power leads. A circuit is used to sense which of the leads is supplying power to the power supply assembly. The filtering of the DC voltage should be adequate to limit the modulation of the inverter AC output voltage to less than 50%. If power is applied between input power leads 16a and 16b, a first inverter circuit is enabled and multi-conductor power connector 22a is energized. If power is applied between input power leads 16a and 16c, a second inverter circuit is enabled and multi-conductor power connector 22b is energized. Corresponding topologies can be used for units requiring DC output voltage to accomplish similar results.

A further variation on this embodiment is for use with for instance three lamp luminaires. By providing power to the ballast for one of the three lamps from one of the two power supplies in the above described power supply assembly and providing power to the ballast for the other two of the three lamps from a second of the two power supplies in the above described power supply assembly, three separate levels of light can be chosen by switched onto input power leads 16a and 16b for $\frac{1}{3}^{rd}$ of full light output, 16a and 16c for $\frac{2}{3}^{rds}$ of full light output, or 16a and 16b, plus 16a and 16c for full light output. Using this approach the maximum capacity of one of the power supply circuits can be designed to be one-half that of the other power supply circuit.

Referring now to FIG. 1, power supply assembly 30 has an enclosure 20 with multi-conductor power connector 22 located on one surface. The enclosure 30 also includes a mounting plate 18 for attachment to junction box 10. Protruding through the mounting plate 18 are input power leads 16a and, 16b for connection to branch circuit leads 12a and 12b using twist-on wire connector 14. The multi-conductor power connector 22 engage mating multi-conductor power connector 24 attached to multi-conductor cable 26.

Figure 2:
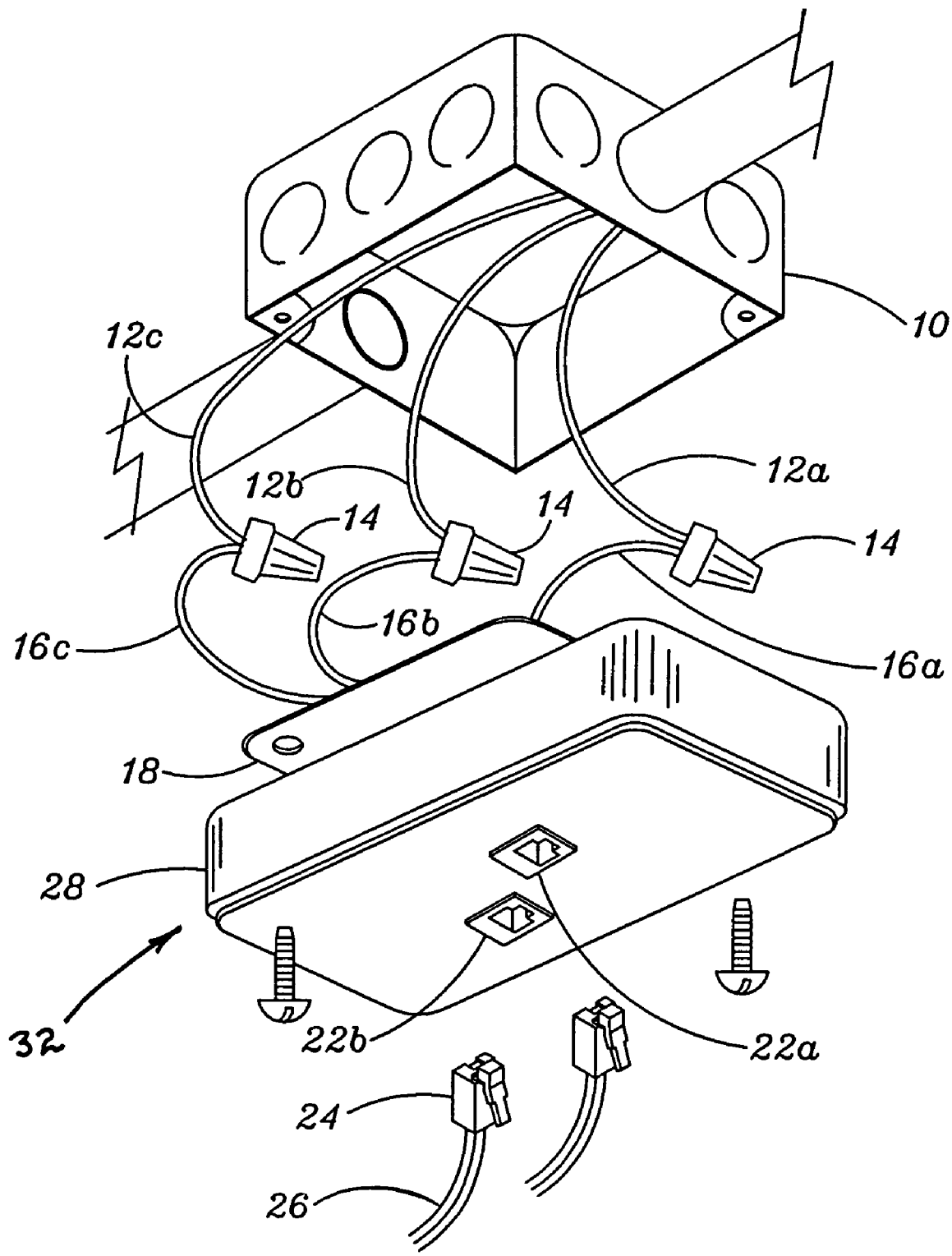
FIG. 2 depicts an exploded perspective view of how an oversized power supply assembly 32 is mounted to an electrical junction box 10.

FIG. 2, is similar to FIG. 1 except the oversized power supply assembly 32 has an oversized enclosure 28 that extends beyond the sides of the junction box to which it is to be mounted. The power supply assembly also shows three input power leads 16a, 16b, and 16c.

There are a number of variations that can be applied to any one of the above embodiments, for instance the description discusses the use of a power supply circuit, which provides a high-frequency sine wave voltage source, but lighting systems can also be powered from high-frequency voltage and current sources as well as direct current voltage and current sources. The electrical box shown in the figures is representative of a standard 4×4 electrical box, but the power supply assembly can be made to attach to a 2×4, an octagon box or any other suitable electrical box.

This application; taken as a whole with the abstract, specification, claims, and drawings being combined; provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

I claim:

1. A power supply assembly for a lighting system comprising: an enclosure, an electronic power supply circuit, at least two input power leads and at least one multi-conductor power connector;

the electronic power supply circuit having at least one output circuit;

the at least one output circuit being connected to the at least one multi-conductor power connector;

the enclosure incorporating at least one aperture to permit fastening the enclosure onto an electrical junction box;

the power supply including at least one pair of input power leads for connection with electrical power supplied by a power utility;

the maximum power available at each multi-conductor power connector being less than the power available to the input power leads; and the frequency of the output voltage from the output circuit being different from the frequency of the power supplied on the input power leads.

2. The power supply assembly of claim 1 wherein the lighting system is a ceiling lighting system.

3. The power supply assembly of claim 1 wherein the lighting system is a gas-discharge lighting system.

4. The power supply assembly of claim 1 wherein the at least one multi-conductor power connector has two terminals;

an alternating voltage exists between the two terminals;

the alternating voltage has a frequency; and the frequency is greater than 10 kilohertz.

5. The power supply assembly of claim 4 wherein the high-frequency voltage is modulated at a second frequency;

the second frequency being significantly lower than 10 kilohertz; and the percent of modulation being less than 50%.

6. The power supply assembly of claim 1 wherein the at least one multi-conductor power connector has two terminals; and a DC voltage exist between the two terminals.

7. The power supply assembly of claim 1 wherein output power is drawn from the multi-conductor power connector; and the output power is electronically limited by the power supply circuit.

8. The power supply assembly of claim 7 wherein the output power is electronically limited to be less than 250 Watts or Volt-Amperes.

9. The power supply assembly of claim 1 wherein the at least one multi-conductor power connector is at least two multi-conductor power connectors.

10. The power supply assembly of claim 1 wherein the at least one multi-conductor power connector is at least two multi-conductor power connectors; and the one member of the set of at least two multi-conductor power connectors is electrically connected to a second member of the set of at least two multi-conductor power connectors.

11. The power supply assembly of claim 1 wherein the at least one multi-condcutor power connector is at least two multi-conductor power connectors;

the at least two multi-conductor power connectors have terminals; and the terminals of a first connector of the set of at least two multi-conductor power connectors are connected in parallel with the terminals of a second connector of the set of at least two multi-conductor power connectors.

12. The power supply assembly of claim 1 wherein the at least one multi-conductor power connector is at least two multi-conductor power connectors;

the at least two multi-conductor power connectors have terminals; and the terminals of a first connector of the set of at least two multi-conductor power connectors are connected in series with the terminals of a second connector of the set of at least two multi-conductor power connectors.

13. The power supply assembly of claim 1 wherein the at least one multi-conductor power connector is at least two multi-conductor power connectors; and a first member of the set of at least two multi-conductor power connectors is electrically isolated from a second member of the set of at least two multi-conductor power connectors.

14. The power supply assembly of claim 13 wherein the first member is electronically limited to a first power level; and the second member is electronically limited to a second power level.

15. The power supply assembly of claim 14 wherein the first power level is substantially the same as the second power level.

16. The power supply assembly of claim 15 wherein the first power level is substantially the different than the second power level.

17. The power supply assembly of claim 15 wherein the first power level is approximately twice the second power level.

18. The power supply assembly of claim 1 wherein the at least one multi-conductor power connector is at least two multi-conductor power connectors;

the at least two input power leads is at least three input power leads;

when power is applied between a first input power lead and second input power lead a first multi-conductor power connectors is energized; and when power is applied between a first input power lead and third input power lead a second multi-conductor power connectors is energized.

19. The power supply assembly of claim 18 wherein the power available from the first multi-conductor power connectors is electronically limited to a first power level; and the power available from the second multi-conductor power connectors is electronically limited to a second power level.

20. The power supply assembly of claim 19 wherein the first power level is substantially the same as the second power level.

21. The power supply assembly of claim 19 wherein the first power level is substantially the different than the second power level.

22. The power supply assembly of claim 19 wherein the first power level is approximately twice the second power level.

23. The power supply assembly of claim 1 wherein the at least one multi-conductor power connector has at least four terminals;

the at least two input power leads is at least three input power leads;

when power is applied between a first input power lead and second input power lead, output power is available between a first pair of terminals within the at least one multi-conductor power connectors; and when power is applied between a first input power lead and third input power lead, output power is available between a second pair of terminals within the at least one multi-conductor power connectors.

24. The power supply assembly of claim 1 wherein the enclosure has a certain height, length, and width;

the power supply being mounted on an electrical junction box;

the electrical junction box has a certain height, length, and width; and the length of the power supply exceeding the length of the electrical junction box.

25. The power supply assembly of claim 24 wherein the length and width of the electrical junction box are substantially equal.

26. A power supply assembly for a lighting system comprising: an enclosure, an electronic power supply circuit, at least two input power leads and at least one multi-conductor power connector;

the electronic power supply circuit having at least one output circuit;

the at least one output circuit being connected to the at least one multi-conductor power connector;

the maximum power available at each multi-conductor power connector being less than the power available to the input power leads; and the frequency of the output voltage from the output circuit being different from the frequency of the power supplied on the input power leads.

27. A power supply assembly for a lighting system comprising: an enclosure, an electronic power supply circuit, at least two input power leads and at least one multi-conductor power connector;

the electronic power supply circuit having at least one output circuit;

the at least one output circuit being connected to the at least one multi-conductor power connector;

the maximum power available at each multi-conductor power connector being less than the power available to the input power leads;

the frequency of the output voltage from the output circuit being different from the frequency of the power supplied on the input power leads; and the enclosure incorporating at least one aperture to permit the fastening of the enclosure onto an electrical junction box.

* * * * *